April 21, 1959   J. E. SUNDERLIN   2,883,563
MAGNETIC PULSE DOUBLING CIRCUIT
Filed Aug. 13, 1957

WITNESSES:
Bernard R. Gregory
Wm. B. Sellers.

INVENTOR
Joseph E. Sunderlin
BY
ATTORNEY

United States Patent Office 2,883,563
Patented Apr. 21, 1959

2,883,563

MAGNETIC PULSE DOUBLING CIRCUIT

Joseph E. Sunderlin, Baltimore, Md., assignor to Westinghouse Electric Corporation, East Pittsburgh, Pa., a corporation of Pennsylvania Application August 13, 1957, Serial No. 677,955

7 Claims. (Cl. 307—106)

This invention relates to magnetic pulse generators and, more particularly, to a pulse generator which transforms an alternating-current input voltage into a pulsed output having a repetition rate equal to twice the input frequency.

Prior to this invention, thyratrons were generally used in conjunction with capacitors or pulse forming networks to produce the sharp output voltage pulses which are needed to drive a magnetron. Thyratrons, however, have a relatively large envelope which makes them bulky and space-consuming. In addition, the thyratron tube is relatively fragile; and, therefore, is sensitive to shock and vibration. Because of its fragile and space-consuming structure, the thyratron cannot be used in some installations where space conservation and rugged construction are required.

It is an object of this invention to provide an all magnetic pulse forming circuit which can be used to drive a magnetron and for other purposes.

Another object of the invention is to provide a saturable magnetic circuit which transforms an alternating-current input signal into a pulsed output having a pulse repetition rate equal to twice the input frequency.

A further object of the invention is to provide a magnetic pulse generator which employs an input transformer having a center-tapped secondary winding to provide two alternating-current signals which are 180° out-of-phase to achieve repetition rate doubling.

A still further object of the invention is to provide a magnetic pulse generator which permits the use of standard size capacitors and also results in practical reactor designs.

The above and other objects and features of the invention will become apparent from the following detailed description taken in connection with the accompanying drawings which form a part of this specification and in which.

Figure 1:
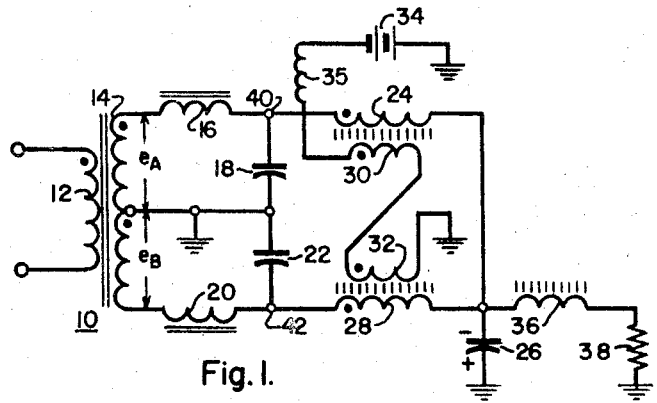
Figure 1 is a schematic circuit diagram of one embodiment of the invention.

In Fig. 1, the manner in which the windings of the transformer and inductors are wound on their associated cores is indicated by dots which represent points of like instantaneous polarity. Thus, if the dots are on the same end of the transformer or inductor core, the windings are wound around the core in the same direction; whereas, if the dots are on opposite ends of the core, the windings are wound in opposite directions.

The circuit shown in Fig. 1 comprises an input transformer 10 having a primary winding 12 adapted for connection to a source of alternating-current input voltage, not shown. The secondary winding 14 of transformer 10 has its center tap connected to ground, substantially as shown. The upper end of secondary winding 14 is connected to ground through a non-saturating inductor 16 and a capacitor 18. Similarly, the lower end of secondary winding 14 is connected to ground through a second non-saturating inductor 20 and a second capacitor 22. The series resonant circuit of inductor 16 and capacitor 18, and that of inductor 20 and capacitor 22, are each usually resonant at the input frequency to provide a high Q charging circuit.

The junction 40 of inductor 16 and capacitor 18 is connected to ground through a first saturable inductor 24 and a capacitor 26. Likewise, the junction 42 of inductor 20 and capacitor 22 is connected to ground through a second saturable inductor 28 and the same capacitor 26. Bias windings 30 and 32 are provided for inductors 24 and 28 respectively; and these bias windings are connected in series between the opposite terminals of a source of bias voltage, such as battery 34. An isolation choke 35 is provided between the battery 34 and the bias windings to limit the current that flows in these bias windings due to induced voltages. It will be noted that the bias winding 30 and the inductor 24 are wound about their common core in the same direction and that, likewise, the bias winding 32 and inductor 28 are also wound about their common core in the same direction. Since battery 34 is connected to apply a negative potential at the forward end of each of the bias windings 30 and 32, inductors 24 and 28 are biased to pass only negative signals appearing at the junctions 40 and 42, respectively.

The ungrounded terminal of capacitor 26 is connected to ground through an unbiased saturable reactor 36 and a load impedance 38, the arrangement being such that the reactor 36 will saturate after the voltage across capacitor 26 reaches a predetermined value.

Figure 2:
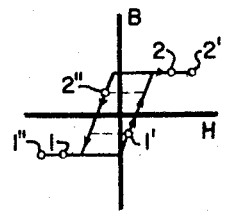
Fig. 2 is an illustration of the hysteresis curve for the various saturable inductors employed in the circuit of Fig. 1.

Operation of the circuit shown in Fig. 1 may best be understood by reference to Fig. 2 and Figs. 3A–3C. In Fig. 2, the rectangular hysteresis curve of the core material used in inductors 24, 28 and 36 is shown. In accordance with well-known magnetic theory, the quantity H represents the field intensity at any instant and is measured in ampere turns per unit of length. The quantity B represents the flux density at any instant and is measured in webers per square unit of area. It can be seen that the core material presents a sharp cut-off point between conditions of saturation (i.e., constant B as H increases) and unsaturation. When a reactor is saturated, it will, of course, present a much lower impedance than when unsaturated. If an alternating-current voltage is applied to the reactor, it may advance from point 1 on the charging cycle of Fig. 2 along the path of the arrows to point 2 and then back down the other side of the curve to point 1. The cycle from point 1 to point 2 and back to point 1 represents one 360° cycle of the applied alternating-current voltage. The location at points 1 and 2 depends upon the amplitude of the applied voltage. If the amplitude of the applied voltage is small enough, saturation may never take place.

The field intensity H varies in direct proportion to ampere-turns which are, in turn, dependent upon applied voltage. Therefore, by applying a bias voltage of a particular value to a winding on the core member, the core can be made to reach saturation in only one direction. Thus, if a direct-current bias voltage of one polarity is applied to a winding on the core member, points 1 and 2 will be shifted to the right as indicated by the numerals 1' and 2'. Under these conditions, the flux density will never reach saturation in the negative direction, provided the applied voltage is not increased, but will follow the dotted line adjacent point 1'. If a direct-current bias voltage of the opposite polarity is applied, the core will saturate in the negative direction only as indicated by the points 1'' and 2''.

As was explained above, the circuit shown in Fig. 1 is designed so that the bias on windings 30 and 32 will permit inductors 24 and 28 to saturate only when there exists a negative voltage at junctions 40 and 42. Assume that a negative voltage does exist at one of these junctions, the time required for the inductor 24 or 28 to saturate is then dependent upon the equation $$B = K \int e \, dt$$

where $B$ = flux density measured in webers per square unit of area;
$K$ = a constant;
$e$ = instantaneous applied voltage; and
$t$ = time in seconds.

It can be seen that the saturation value of flux density B depends upon the product $\int e \, dt$, measured in volt-seconds. In other words, the flux density depends upon the applied voltage and the time duration of that voltage. Therefore, inductors 24 and 28 can be made to saturate in a shorter time period if the negative voltage at junctions 40 and 42 is increased. Conversely, if the voltage at junctions 40 and 42 decreases, the time required for saturation of inductors 24 and 28 increases.

Figure 3A:
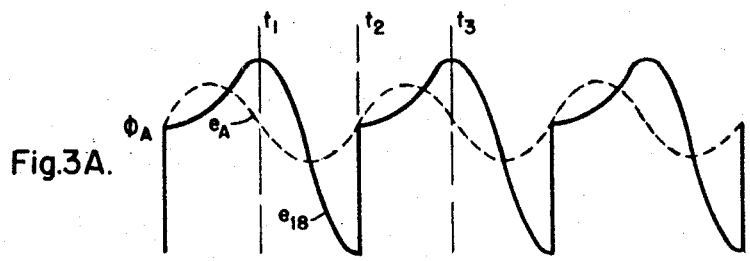
Figs. 3A–3C illustrate voltage waveforms appearing across various points in the circuit of Fig. 1 to illustrate the operation of the invention.

The voltage $e_A$ appearing across the upper half of secondary winding 14 and the voltage $e_{18}$ appearing across capacitor 18 are shown in Fig. 3A. At the start of one 360° cycle of the voltage $e_A$, the voltage $e_{18}$ across capacitor 18 increases in the positive direction and then decreases after $e_A$ swings negative at time $t_1$. A negative voltage across capacitor 18 will thus build up until time $t_2$ is reached when the volt-second integral $\int e \, dt$ of inductor 24 is sufficient to saturate the same. At this point, the impedance of the inductor falls to substantially zero; and the voltage at junction 40 charges capacitor 26 with the polarity shown. Capacitor 26 will continue to charge until the volt-second integral across inductor 36 is sufficient to saturate the same. At this point, inductor 36 will saturate to discharge capacitor 26 through the load impedance 38 to produce an output pulse $P_1$, shown in Fig. 3C.

Figure 3B:
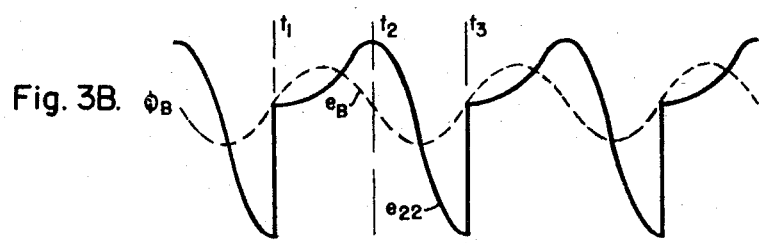
Figure 3C:
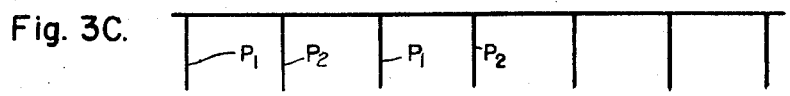

The voltage $e_B$ across the lower half of secondary winding 14 and the voltage $e_{22}$ across capacitor 22 are shown in Fig. 3B. By virtue of the center-tapped connection of winding 14, the voltage $e_B$ lags voltage $e_A$ by 180°. Thus, at time $t_1$ when capacitor 18 is beginning to charge in the negative direction, capacitor 22 begins to charge in the positive direction. At time $t_2$, when inductor 24 saturates, capacitor 22 is just beginning to charge in the negative direction. Then, at time $t_3$ the volt-second integral $\int e \, dt$ across inductor 28 is sufficient to saturate the same whereby the impedance across this reactor decreases to substantially zero and capacitor 22 discharges into capacitor 26 with the polarity shown. The action of inductor 36 for the pulse from capacitor 22 is the same as that from capacitor 18. That is, the capacitor 26 will discharge through inductor 36 when the volt second integral across this inductor saturates the same to produce a second pulse $P_2$, shown in Fig. 3C, across load impedance 38.

Thus, for each 360° cycle of the input voltage applied to primary winding 12, two output pulses of the same polarity are produced across load impedance 38.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A pulse doubling circuit comprising, in combination, an input transformer having a primary winding adapted for connection to a source of alternating-current voltage and a secondary winding having its midpoint connected to a point of reference potential, a first inductor and a first capacitor connected in series between one end of said secondary winding and said point of reference potential, a second inductor and a second capacitor connected in series between the other end of said secondary winding and said point of reference potential, a third capacitor having one terminal connected to said point of reference potential, a first saturable reactor connected between the other terminal of said third capacitor and the junction of said first inductor and said first capacitor, and a second saturable reactor connected between said other terminal of the third capacitor and the junction of said second inductor and said second capacitor.

2. A pulse doubling circuit comprising, in combination, an input transformer having a primary winding adapted for connection to a source of alternating-current voltage and a secondary winding having its midpoint connected to a point of reference potential, a first inductor and a first capacitor connected in series between one end of said secondary winding and said point of reference potential, a second inductor and a second capacitor connected in series between the other end of said secondary winding and said point of reference potential, a third capacitor having one terminal connected to said point of reference potential, a first saturable reactor connected between the other terminal of said third capacitor and the junction of said first inductor and said first capacitor, a second saturable reactor connected between said other terminal of the third capacitor and the junction of said second inductor and said second capacitor, a load impedance, and a third saturable reactor connected in series with said load impedance between said other terminal of the third capacitor and said point of reference potential.

3. A pulse doubling circuit comprising, in combination, an input transformer having a primary winding adapted for connection to a source of alternating-current voltage and a secondary winding having its midpoint connected to a point of reference potential, a first inductor and a first capacitor connected in series between one end of said secondary winding and said point of reference potential, a second inductor and a second capacitor connected in series between the other end of said secondary winding and said point of reference potential, a third capacitor having one terminal connected to said point of reference potential, a first saturable reactor connected between the other terminal of said third capacitor and the junction of said first inductor and said first capacitor, a second saturable reactor connected between said other terminal of the third capacitor and the junction of said second inductor and said second capacitor, and means for biasing said first and second saturable reactors whereby the reactors will saturate only in response to voltages of one polarity existing at said junctions.

4. A pulse doubling circuit comprising, in combination, an input transformer having a primary winding adapted for connection to a source of alternating-current voltage and a secondary winding having its midpoint connected to a point of reference potential, a first current path including an inductor and a capacitor connected between one end of said secondary winding and said point of reference potential, a second current path including an inductor and a capacitor connected between the other end of said secondary winding and said point of reference potential, a third current path including a saturable reactor and a capacitor connected between a point on said first current path and said point of reference potential, and a fourth current path including a saturable reactor connected between a point on said second current path and a point on said third current path.

5. A pulse doubling circuit comprising, in combination, an input transformer having a primary winding adapted for connection to a source of alternating-current voltage and a secondary winding having its midpoint connected to a point of reference potential, a first current path including an inductor and a capacitor connected between one end of said secondary winding and said point of reference potential, a second current path including an inductor and a capacitor connected between the other end of said secondary winding and said point of reference potential, a third current path including a saturable reactor and a capacitor connected between a point on said first current path and said point of reference potential, a fourth current path including a saturable reactor connected between a point on said second current path and a point on said third current path, and means for biasing said reactors whereby the reactors will saturate only in response to voltages of one polarity.

6. A pulse doubling circuit comprising, in combination, an input transformer having a primary winding adapted for connection to a source of alternating-current voltage and a secondary winding having its midpoint connected to a point of reference potential, a first current path including an inductor and a capacitor connected between one end of said secondary winding and said point of reference potential, a second current path including an inductor and a capacitor connected between the other end of said secondary winding and said point of reference potential, a third current path including a saturable reactor and a capacitor connected between a point on said first current path and said point of reference potential, a fourth current path including a saturable reactor connected between a point on said third current path and a point on said second current path, and a fifth current path including a saturable reactor and a load impedance connected between a point on said third current path and said point of reference potential.

7. In a magnetic pulse doubling circuit, first and second capacitors each having one terminal operatively connected to a point of reference potential, means for applying alternating current voltages across said first and second capacitors, impedance means having one terminal operatively connected to said point of reference potential, a first saturable reactor operatively connected between the other terminal of said first capacitor and the other terminal of said impedance means, a second saturable reactor operatively connected between the other terminal of said second capacitor and said other terminal of said impedance means, and means for biasing said first and second reactors whereby the reactors will saturate only in response to voltages of one polarity existing at the respective said other terminals of said first and second capacitors.

References Cited in the file of this patent
UNITED STATES PATENTS

| | | |
|---|---|---|
| 2,709,759 | Kabuss et al. | May 31, 1955 |
| 2,727,159 | Sunderlin | Dec. 13, 1955 |